Aug. 28, 1962 W. J. HOWARD 3,051,349
CLOSURE FOR OIL PAN DRAIN OPENING
Filed April 19, 1961

INVENTOR
WILLIAM J. HOWARD
BY *Aubrey D. McFadyen*
ATTORNEY

United States Patent Office

3,051,349
Patented Aug. 28, 1962

3,051,349
CLOSURE FOR OIL PAN DRAIN OPENING
William J. Howard, P.O. Box 573, Wilson, N.C.
Filed Apr. 19, 1961, Ser. No. 104,073
5 Claims. (Cl. 220—39)

This invention pertains to closures, and more particularly to a closure in the form of a self-threading plug to be screwed into a threaded opening such as the oil drain outlet of a motor vehicle oil pan, or the like.

For closing the threaded oil drain opening of motor vehicle crank cases, fluid transmissions, power steering systems, and the like, threaded iron plugs are presently in common use. These plugs consist of a threaded plug body having a head, the head portion being formed with a socket or exterior angular faces for reception of a driving tool. The head of the conventional threaded plug also is commonly formed with a peripheral flange, and a portion of the plug contiguous said flange is left unthreaded for receiving there around a ring washer of soft metal, usually copper. As the plug is screwed into place said washer is compressed between said flange and said crank case for preventing seepage of oil about said plug. Through a combination of wear and carelessness of service station attendants in precisely re-inserting these plugs after oil drainage, the threads of the drain opening are frequently mutilated, the plug getting out of axial alignment with the drain opening, and thereby permitting leakage thereabout. Further, repeated, heavy-handed re-application of these plugs frequently squash the washer and reduce and sometimes even destroy its effectiveness. Also, the unthreaded area of the plug sometimes enters said threaded opening, with the threaded area of the plug passing completely into the oil chamber. In the latter situation, removal of the plug is difficult and time consuming.

In the past, for overcoming the difficulties and objections arising from wear, thread mutilation, over-compression of said washer, etc., service station attendants have resorted to replacement by a new plug, generally of oversize. Where the threads are mutilated, the replacement plug often is in the form of a case hardened threaded plug for self-tapping its way into said opening. Each of the aforementioned replacement plugs, however, itself is subject to oil seepage or drip, as well as to the objections encountered with original plugs, as recited above.

In the light of the foregoing, the primary object of the present invention is to provide a closure plug of the class mentioned which eliminates seepage thereabout and resultant dripping of oil.

A further important object of this invention is to provide a plug which does not require provisional threading, but by self-threading will fit itself fluid tight to the thread of the opening it is applied to.

Another object of this invention is to provide a plug which requires no washer, and which even in rough usage, will not damage the threads of the opening to which the plug is applied.

Still another object of this invention is the provision of a single self-threading plug which will make a seepage free seal with both standard and over-size openings of the same denomination.

Other objects include the provision of a closure or plug which is relatively inexpensive, may readily be installed without use of special tools, and may be re-used many times.

Still further objects and advantages of the present invention will become apparent as this specification progresses, reference now being made to the accompanying drawings therein:

Figure 1:
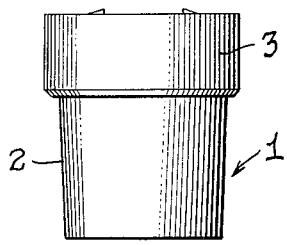
FIGURE 1 is a view in elevation of a plug according to the present invention before being applied to a threaded drain opening.

In the drawings, reference character 1 designates generally a closure plug of the present invention. This plug included an unthreaded tapered portion 2 of circular cross-section, and a head or flange portion 3 integral with the larger end of portion 2. Flange 3 serves to strengthen the head and to limit movement of the plug into the threaded opening. The smaller end of tapered portion 2 is of a diameter to readily enter the base size opening for which the particular plug is designed. The present plug is made of permanently deformable material, the surface of which, when the plug is screwed into a tapped opening, will be indented by and conform exactly with the threads of said opening. To the end just mentioned, the plug is formed of tough, rigid material, softer than the material defining said drain opening, and yet permanently deformable under the thread engaging conditions just mentioned.

The plug may be of one of the softer metals, such as copper; but I have found certain plastics, particularly nylon, an almost ideal material for the use to be encountered by the present plug. In this regard, nylon is quite tough, as well as rigid, is deformable or flowable to conform to the threads of said opening, does not corrode, and once applied it will not shake loose. Finally, nylon lends itself to molding, which in turn permits manufacture of the plug of the present invention at a favorable price.

In tightly screwing the unthreaded nylon plug into a threaded opening in a metal body, permanent threads 7 exactly corresponding to those of the opening will be indented in the surface of the plug, and the fit between the threads of the opening and those formed on the plug, together with the resilience of the plug, effect an absolutely leak-proof joint. A washer is unnecessary in conjunction with the present plug.

Figure 2:
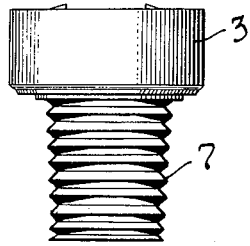
FIGURE 2 is a view of a smaller size plug than that shown in FIGURE 1, after having been screwed into a threaded opening and removed therefrom.
Figure 3:
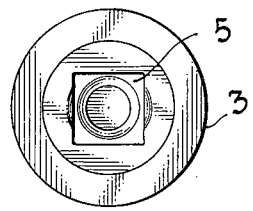
FIGURE 3 is a plan view of the outer end or head of the plug of FIGURES 1 and 2, showing the wrench receiving socket for facilitating insertion of the plug.
Figure 4:
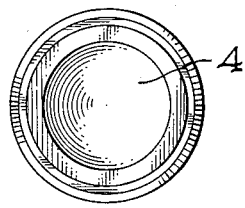
FIGURE 4 is a plan view of the inner end of the plug of FIGURE 1.
Figure 5:
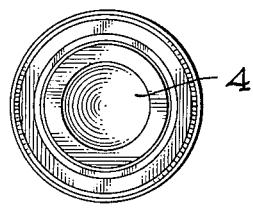
FIGURE 5 is a plan view of the inner end of the plug of FIGURE 2.
Figure 6:
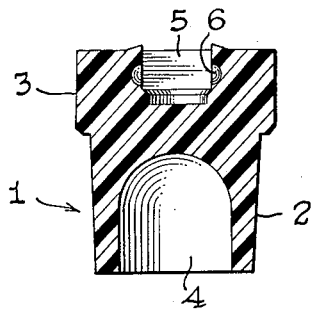
FIGURE 6 is a vertical section of the plug of FIGURE 1.
Figure 7:
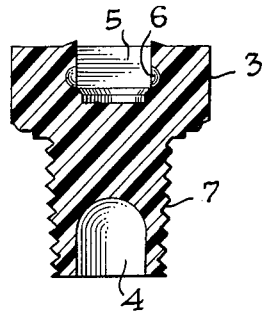
FIGURE 7 is a vertical section of the plug of FIGURE 2.

According to the present invention the taper of portion 2 is sufficient that its smaller end is of a diameter to be readily, though somewhat snugly, started in a new or standard size drain opening, while the opposite end portion thereof is of a diameter somewhat larger than that of an over-size oil drain opening; that is a worn or re-threaded opening, let us say, for example, of a Ford automobile. Thus the one plug will meet the requirements of all sizes of opening likely to be encountered in the particular model or make of automobile mentioned. FIGURES 1 and 6 depict the present commercial embodiment of a plug designed for a ¾ inch drain opening, and over-sizes thereof; while FIGURES 2 and 7 depict a plug designed for a ½ inch drain opening. Once the smaller end of the plug is introduced into said threaded opening, upon rotating the plug while imparting an initial axial thrust thereto, the plug will become threaded as it is screwed into the opening.

Where the threads of the drain opening have not been mutilated, the nylon plug herein disclosed can be removed and replaced repeatedly without lessening its sealing property or its ability to grip and adhere to the wall of said valve opening. Even in situations where the threads of the opening have been previously damaged by the conventional plug, as previously alluded to, a nylon plug may be re-used many times.

For facilitating screwing of the plug of the present invention into place while applying an initial thrust thereto, as hereinbefore mentioned, head 3 of the plug is formed with a central socket 5 of square cross-section for receiving a ⅜ inch conventional socket drive device. At least one side wall of said socket is formed with a semicircular pocket 6 for receiving the spring biased ball element of said device. The plug, according to this invention, may be made either by machining or by molding. When the plug is formed by molding the socket 5 and pocket 6 may be formed in the one molding operation. It is feasible, however, to cast the present plug without pockets 6 and subsequently form these pockets by an indenting operation.

The smaller end of tapered portion 2 is shown in FIGURES 6 and 7 as formed with a socket 4. This arrangement at once effects a savings in material and at the same time provides space to which the material of the plug may flow under the constrictive force involved in forcing the plug into a threaded opening.

The foregoing disclosure and description of the invention is merely illustrative and explanatory thereof, and various changes in size, shape and material, as well as in details of the construction illustrated my be made within the scope of the following claims without departing from the scope of the invention.

What is claimed is:

1. A plug for closing a tapped drain outlet of the kind described comprising an elongate unthreaded body of circular cross-section, said body being tapered substantially throughout its length and provided at its larger end with means for receiving a driving tool for imparting combined axial thrust and torque to said body, said body being formed of tough, rigid material softer than the material defining said outlet, and the surface of said body being permanently deformable to exactly correspond with the threads of said outlet on screwing said body thereinto.

2. A closure for a tapped oil drain opening of the kind described comprising an elongate unthreaded body of circular cross-section, said body being tapered substantially throughout its length and formed of tough, rigid material softer than the material deferring said opening and provided at its larger end with means for receiving a driving tool for imparting combined axial thrust and torque thereto, the smaller end of said tapered body being of a diameter to readily enter a standard size of said opening and the larger portion of said tapered body being of somewhat greater diameter than the maximum likely oversize of said standard opening.

3. A plug for closing a tapped metal oil drain outlet of this kind described consisting of an elongate unthreaded body of nylon of circular cross-section said body being tapered substantially throughout its length, the end of said body of smaller diameter being of a size to enter a standard size of said outlet and the larger portion of said tapered body being of a diameter in excess of the maximum likely oversize of said standard outlet, whereby upon force screwing of said tapered body into said outlet said tapered portion will be permanently deformed to exactly correspond with the threads of said outlet.

4. A plug for closing a tapped opening formed in a metal member, said plug consisting of an elongate unthreaded body of nylon of circular cross-section, said body being tapered substantially throughout its length and the end of said body of smaller diameter being of a size to enter a standard size of said opening and the larger portion of said tapered body being of a diameter in excess of the maximum likely oversize of said standard opening, the larger end of said body having an integral radially flanged head portion for receiving a driving tool for imparting combined axial thrust and torque to said body, whereby upon force screwing of said tapered body into said opening said tapered portion will be permanently deformed to exactly correspond with the threads of said opening.

5. A closure for a threaded fluid outlet structure, said closure consisting of a body having an elongate, tapered, unthreaded portion of circular cross-section for application to said outlet structure and having integrally formed with one end thereof means for receiving a driving tool for imparting combined axial thrust and torque to said body, said body being formed of tough, rigid material softer than the material defining said outlet structure, and the surface of said tapered, unthreaded portion being deformable to exactly correspond with the threads of said outlet structure upon application of said body thereto.

References Cited in the file of this patent
UNITED STATES PATENTS

| | | |
|---|---|---|
| 2,561,036 | Sodders | July 17, 1951 |
| 2,722,238 | Stuvel | Nov. 1, 1955 |